(12) United States Patent
Yan

(10) Patent No.: US 6,821,305 B2
(45) Date of Patent: Nov. 23, 2004

(54) PROCESS OF PRODUCING A COLORED AREA OF DESIRED DEPTH IN AN ANODIZED LAYER OF METAL ARTICLE

(75) Inventor: Peter Yan, Van Nuys, CA (US)

(73) Assignee: Jas. D. Easton, Inc., Van Nuys, CA (US)

( * ) Notice: Subject to any disclaimer, the term of this patent is extended or adjusted under 35 U.S.C. 154(b) by 71 days.

(21) Appl. No.: 10/405,777

(22) Filed: Apr. 1, 2003

(65) Prior Publication Data

US 2004/0194235 A1 Oct. 7, 2004

(51) Int. Cl.$^7$ .............................. D06P 3/80; B23K 26/36
(52) U.S. Cl. ...................... 8/522; 219/121.69; 427/556; 428/306.6
(58) Field of Search ..................... 219/121.69, 121.85; 427/554, 555, 556; 428/306.6, 315.5; 8/522

(56) References Cited

U.S. PATENT DOCUMENTS

| | | | | | |
|---|---|---|---|---|---|
| 4,547,649 | A | * | 10/1985 | Butt et al. | 219/121.66 |
| 5,215,864 | A | * | 6/1993 | Laakmann | 430/293 |
| 5,523,125 | A | * | 6/1996 | Kennedy et al. | 427/555 |
| 5,851,335 | A | * | 12/1998 | Budnik et al. | 156/257 |
| 6,451,421 | B1 | * | 9/2002 | Robertson et al. | 428/315.5 |

* cited by examiner

*Primary Examiner*—Geoffrey S. Evans
(74) *Attorney, Agent, or Firm*—Roth & Goldman, P.A.

(57) ABSTRACT

A process of coloring an anodized layer on a metal article comprising laser marking an area to be colored to a desired depth and applying a polymerizable ink to color the area to the desired depth. The ink may optionally include a volatile aqueous or non-aqueous solvent, a curing catalyst and various performance enhancing additives.

22 Claims, No Drawings

PROCESS OF PRODUCING A COLORED AREA OF DESIRED DEPTH IN AN ANODIZED LAYER OF METAL ARTICLE

FIELD OF THE INVENTION

The present invention relates in general to color marking of selected areas of an anodized layer on a metal article. More particularly, the invention is concerned with production of metal articles having a smooth and durable multi-colored surface, such as an adjustable inner shock absorber tube made of aluminum or aluminum alloy. The shock absorber tube, such as for a bicycle, may have an anodized surface marked with graduations to determine the travel and adjustment of the shock absorber. The selected area or areas to be colored are defined by techniques such as laser etching or mechanical engraving.

BACKGROUND AND PRIOR ART

Decorated products made of aluminum and its alloys have been produced for many years by first producing an anodized surface on the article. The anodized surface, being porous, may then be dyed and sealed. Lasers have been used to etch selected areas of the surface to expose and restore, to a certain extent, the affinity of the anodized surface to receive dye of other colors so that secondary colors may be applied to the engraved areas which may be once again sealed.

Mechanical engraving has also been used to mark a surface of an article to be colored. When laser etching is used to mark the surface of the article, the heat generated by the laser beam causes the original color to undesirably discolor, become white-on-base, or become metallic silver (the natural color of aluminum). The resulting appearance is rather plain and unattractive.

Various other techniques have been used on sealed and unsealed anodized aluminum surfaces to produce additional visible colored or decoration including application of decals, heat transfer printing, pad printing, silk screen printing, ink jet printing, sublimation printing, mechanical engraving and mechanical stamping. The colors and decorations produced by these techniques have various degrees of surface smoothness and permanency.

U.S. Pat. No. 5,215,864 issued Jun. 1, 1993 to Laakmann is a typical example of prior art which describes multi-coloring an anodized aluminum surface by first dyeing and sealing the surface. Then a laser beam is used to simultaneously unseal and remove dye from selected areas of the surface. A second color is then applied to the laser marked areas. A transparent lacquer can then be applied over the surface of the article to protect and seal the dyes.

The coloration used in the engraved areas produced according to prior art techniques is obtained from water soluble dyes or dyes such as those used in felt tip pens. Such dyes tend to fade quickly when exposed to sunlight. If dye is applied to the etched areas by the manual use of felt tip pens or the like, the process is too slow for economic commercial use particularly when color must be applied to a relatively large surface area. Furthermore, hot water sealing leaches out dye applied to the etched area and requires maintenance of boiling temperature (typically 100° C. or 212° F.) for well in excess of 15 minutes using de-ionized water at the proper pH to be effective. In addition, hot water sealing involves the potential risk of heat deformation and/or water damage of the article. On the other hand, use of a lacquer spray to seal the colored surface of the article results in a more uneven surface texture on the article.

It is accordingly an object of the invention to provide an improved process of coloring selected areas of anodized surfaces of metal articles which results in a multi-colored smooth durable surface.

SUMMARY OF THE INVENTION

The invention provides a process for producing a colored area of desired depth in an anodized layer of a metal article comprising the steps of:

a) defining an area of said layer to be colored by etching said area to a desired depth with a laser beam of selected intensity for a selected time;

b) applying an ink comprised of a polymerizable resin binder and colorant to said area to color said area to said desired depth; and c) curing said resin binder.

DETAILED DESCRIPTION

Metal articles to be colored are first anodized to provide a porous color receptive layer thereon. For aluminum articles, the anodized layer may be a MIL SPEC Type II (conventional anodized layer) or Type III (a hard anodized layer) and of either Class 1 (non-dyed) or Class 2 (dyed). The article may be anodized in a sulfuric acid based electrolyte using direct current (DC) or AC (alternating current) superimposed DC. The power can vary between 5 amps or lower/square foot ($0.5 A/dm^2$) to 30 amps or higher/square foot ($3.2 A/dm^2$) depending on the temperature of the electrolyte, properties of the anodized coating desired, thickness, clarity, and the like. The anodized layer thus formed consists essentially of porous metal oxide and entrapped impurities from the metal and alloy itself and other chemicals, such as sulfate, present in the electrolyte solution and is capable of absorbing certain colorants such as aqueous solutions of acid dyes of the azo types. The anodized surface of the article may, if desired, be dyed to a desired color and shade and sealed.

Preferably, the surface is sealed by immersion in a hot nickel or cobalt solution to improve the fade resistance or lightfastness of any dye which has been applied. In the sealing step, nickel hydroxide is precipitated at the openings of the dye containing pores forming solid plugs which prevent leaching of the dye. Scaling in a hot nickel solution also hydrates the aluminum oxide of the walls of the pores and results in volume expansion thus reducing the pore size. Boiling the article in deionized water at the proper pH can alternatively be used to seal the exposed pores and any applied dye but this is time consuming and results in an inferior seal and more color fading and a higher tendency for the dye to leach during the sealing process. Hence, it is preferred to use nickel and other compounds including cobalt to provide the required sealing properties.

Laser Preparation of Area to be Colored

Lasers are advantageous for marking or etching the area or areas of the article to be colored due to the precision and inherent ease of control of laser systems. For example, carbon dioxide ($CO_2$) lasers and neodymium-yttrium-aluminum-garnet (Nd-YAG), of various power levels of between about 5 and 100 watts or more may be used. Typically, the lower power beam of a carbon dioxide laser system yields sufficient heat for use in the present invention if the objective is to merely to burn off sealant, applied dye, and any desired depth of the underlying anodized layer while leaving the adjacent sealed anodized layer and some of the underlying anodized coating relatively intact. Higher intensity beams such as those capable of being produced by Nd-YAG laser systems easily can etch or burn off not only the seal and any previously applied dye in the anodized layer but can also partially or entirely remove the anodized layer, and even some of the base metal of the article. Depending on the depth of the anodized layer to which additional color is to be applied, low or higher power laser beams may be chosen. A change of color in the laser etched area necessarily occurs. The appearance of a carbon dioxide laser marked surface typically ranges from a lighter shade of the dye (discoloration), if used, to somewhat white coloration depending on the duration, power and mode of application (pulsed or continuous) of the laser beam.

High power lasers of 25 watts to 100 watts or more as typically delivered by a Nd-YAG laser can be used if it is desired to not only remove the seal and dye, if any, in the area to be colored but also to remove some or all of the anodized coating and, if desired, the underlying metal as well so that etching proceeds well into the base metal depending on the time and power setting. Particularly if the anodized layer is completely burned off, application of additional color in the laser etched area by using a dye will not result in uniform color, nor a smooth outer surface, and the dye does not readily adhere to the base metal.

According to the present invention, color is applied to the laser prepared area in a single coloration sealing step which results in an article having a smooth, durable and multicolored surface. Several different colors can be applied to different areas by successively repeating the laser marking and color application steps with different colors as desired.

The Ink

To this end, a uniquely formulated ink is provided which comprises a polymerizable resin binder, a colorant which may comprise soluble dye and/or suspended pigment and, optionally, a catalyst to accelerate polymerization. A volatile solvent may be added to control viscosity.

A) The Binder

The resin binder is a polymerizable composition which may be formulated to be soluble in water or a non-aqueous solvent. The binder therefore may be selected from among epoxy, polyurethane, polyester and enamels. The polymerizable binder is preferably a thermosetting material. Air curable thermoplastics such a cellulose, vinyl and acrylic lacquer on the other hand do not possess adequate resistance to oil, grease and other materials to which products such as bicycle shock absorbers are commonly exposed.

If a solvent is used as described below for adjustment of ink viscosity, the binder should be formulated of materials which are soluble in the selected solvent such as water or a non-aqueous solvent.

B) The Colorant

The color component may comprise a dye or dyes and/or pigment particles which will be suspended in the binder and solvent, if used. Suitable dyes include water soluble monoazo and diazo dyes used with water based ink and water soluble resin binder. Other suitable dyes are soluble in other solvents, such dyes including, but not limited to, anthraquinones, phthalocyanines, and azo dyes. Organic or inorganic pigment particles may be used. Soluble dyes are considered particularly attractive and preferred coloring agents due to their translucent nature that brings out vibrant and brilliant reflection from the anodized coating and the base metal. Other color components may also be used alone or included such as fluorescent dyes, ultra-violet fluorescent dyes, phospho-fluorescent pigments phospho-luminescent pigments and optical brighteners including, but not limited to the stilbene, biphenyl, pyrazoline, coumarin, carbostyril, naphthalimide, pyrene, pyridotriazole, dibenzothiophene, and their derivatives in the ink alone or in combination with standard color dyes when special colors or effects are needed for special applications or identification indicia.

C) The Solvent

Viscosity of the ink is easily controlled by selecting relative proportions of solvent, dye and/or pigment particles, and low, medium, or high molecular weight resin binder. The concentration of dye, suspended pigment particles and solvent can be adjusted as necessary to produce the desired viscosity, shade and aesthetic result. Preferably, the solvent is non-aqueous and is selected from the class consisting of alcohol, amine, halogenated hydrocarbon, ester, ether, hydrocarbon, ketone, nitroparaffin and mixtures of the foregoing; and said colorant comprises dye selected from the class consisting of anthraquinones, phthalocyanines, and azos dyes.

D) Other Additives

Additional functional additive(s) may also be included in the ink such as adhesion promoter, water repellent, leveling agent, slip agent from silane, wax, acrylate, and fluoro polymer groups to improve or enhance the performance of the ink. Ultraviolet stabilizers and absorbers may also be added to the ink formulation to enhance the photodegradation stability of the ink under sunlight or outdoor exposure.

The following ink formulations have been found acceptable for coloration of anodized aluminum surfaces intended for use as shock absorber tubes:

1) Penetrating Ink for Laser Marked Anodized Surfaces

In general, this ink, which is intended for use when the laser prepared area is etched to a relatively shallow depth to primarily remove only the surface seal and any dye initially present, and perhaps some of the anodized layer, may be formulated from 10–80% acrylic lacquer resin; 1–10% dye/pigment particles and 20–90% solvent. A suitable royal blue solvent based ink in accordance with this general formulation is comprised of: 50% Acryloid B-48S from Rohm & Haas Company; 45% PM Acetate; and 5% C.I. Solvent Blue 45.

2) Grouting Ink for Surfaces Laser Etched to Base Metal

In general, a thicker grouting ink, primarily intended for use when larger cavities result from etching to or even into the base metal, may be formulated from: 10–80% epoxy resin/curing agent; 1–20% dye/pigment and 20–90% solvent. A suitable bright candy apple red polymerizing ink in accordance with this general formulation is comprised of: 80% Epon resin 1001–B80/V-15 from Shell Chemical Company; 15% PM acetate or ethyl acetate; and 5% C.I. Solvent Red 124.

Application of Ink to the Laser Prepared Area

Ink formulated as above may be applied to the article in the marked or etched area or areas to be colored simply by wiping of the ink onto the article with a felt pad, cotton rag, sponge, or any suitable absorbent applicator impregnated or wetted with the ink. Alternatively, the ink may be applied by immersing the marked areas of the article in an ink bath or by spraying the ink onto the exposed (unsealed) area of the article. Regardless of the method of application, sufficient ink is applied to fill any pores in the anodized layer or cavities in the base metal. After curing, an article with a layer having coloration to a desired depth and a surface of adequate smoothness results, so that the article may be reliably used in an environment such as a shock absorber tube subject to constant rubbing of seals and subject to oil, grease and other road contaminants.

If further colors are desired the steps of the process are repeated. The inks described above adhere if necessary to exposed base metal due to presence of the resin binder in the ink so that the ink functions not only as a colorant but also as a filler and grouting material to fill voids and cavities left in the anodized surface and any etched away base metal. This results in a smooth colored surface in which the color extends to a desired depth so that the surface may be repeatedly rubbed without loss of color and is therefore functionally suitable for articles such as shock absorber tubes. The ink formulation also protects the base metal from corrosion while simultaneously coloring and sealing the laser marked/etched areas. It should now be apparent that different areas of the laser marked and/or engraved surface can be treated with inks of different formulations to achieve a variety of desired effects.

Curing

After application, the ink is then cured, preferably in an accelerated manner, as by exposure to radiation such as ultra-violet for ultra-violet curing resins or by heating for the desired length of time to dry acrylics or cure catalyzed resins.

Persons skilled in the art will understand that various modifications can be made to the invention described above and that the scope of protection is defined by the wording of the claims which follow.

What is claimed is:

1. A process for producing a colored area of desired depth in an anodized layer of a metal article comprising the steps of:
    a) defining an area of said layer to be colored by etching said area to a desired depth with a laser beam of selected intensity for a selected time;
    b) applying an ink comprised of a polymerizable resin binder and colorant to said area to color said area to said desired depth; and
    c) curing said resin binder.

2. The process of claim 1, wherein said area is etched by said laser beam to a depth to remove a surface seal and dye present in said anodized layer.

3. The process of claim 1, wherein said area is etched by said laser beam for a time sufficient to remove a portion of said anodized layer.

4. The process of claim 3, wherein said area is etched by said laser beam for a time sufficient to remove said anodized layer.

5. The process of claim 4, wherein said area is etched by said laser beam for a time sufficient to remove part of base metal of said article underlying said anodized layer.

6. The process of claim 5, wherein said binder is thermosetting.

7. The process of claim 6, wherein said colorant is selected from the class consisting of water soluble monoazo and diazo dyes and said ink includes water.

8. The process of claim 6, wherein said ink includes a non-aqueous solvent selected from the class consisting of alcohol, amine, halogenated hydrocarbon, ester, ether, hydrocarbon, ketone, nitroparaffin and mixtures of the foregoing; and said colorant comprises dye selected from the class consisting of anthraquinones, phthalocyanines, and azos dyes.

9. The process of claim 3, wherein said binder is thermosetting.

10. The process of claim 9, wherein said colorant is selected from the class consisting of water soluble monoazo and diazo dyes and said ink includes water.

11. The process of claim 9, wherein said ink includes a non-aqueous solvent selected from the class consisting of alcohol, amine, halogenated hydrocarbon, ester, ether, hydrocarbon, ketone, nitroparaffin and mixtures of the foregoing; and said colorant comprises dye selected from the class consisting of anthraquinones, phthalocyanines, and azos dyes.

12. The process of claim 1, wherein said binder is thermosetting.

13. The process of claim 12, wherein said colorant is selected from the class consisting of water soluble monoazo and diazo dyes and said ink includes water.

14. The process of claim 12, wherein said ink includes a non-aqueous solvent selected from the class consisting of alcohol, amine, halogenated hydrocarbon, ester, ether, hydrocarbon, ketone, nitroparaffin and mixtures of the foregoing; and said colorant comprises dye selected from the class consisting of anthraquinones, phthalocyanines, and azos dyes.

15. The process of claim 1, wherein said ink is applied to said area by immersion of said article in a bath of said ink.

16. The process of claim 1, wherein said ink is applied by wiping onto said area.

17. The process of claim 1, wherein said ink is applied by spraying said ink onto said area.

18. The process of claim 1, further comprising the step of adding one or more of the following components to said ink: fluorescent dyes, ultra-violet fluorescent dyes, phospho-fluorescent pigments, phospho-luminescent pigments, and optical brighteners.

19. The process of claim 1, wherein said ink is cured by exposure to artificial radiation.

20. The process of claim 1, comprising the steps of repeating said steps a), b) and c) as necessary to apply additional colors to additional selected areas of said article.

21. An article produced by the process of claim 1.

22. A shock absorber tube produced by the process of claim 1.

* * * * *